(12) United States Patent
Schlueter et al.

(10) Patent No.: US 7,678,605 B2
(45) Date of Patent: Mar. 16, 2010

(54) METHOD FOR CHEMICAL MECHANICAL PLANARIZATION OF CHALCOGENIDE MATERIALS

(75) Inventors: James Allen Schlueter, Phoenix, AZ (US); Bentley J. Palmer, Phoenix, AZ (US)

(73) Assignee: DuPont Air Products NanoMaterials LLC, Allentown, PA (US)

( * ) Notice: Subject to any disclaimer, the term of this patent is extended or adjusted under 35 U.S.C. 154(b) by 0 days.

(21) Appl. No.: 12/190,882

(22) Filed: Aug. 13, 2008

(65) Prior Publication Data

US 2009/0057834 A1 Mar. 5, 2009

Related U.S. Application Data

(60) Provisional application No. 60/968,924, filed on Aug. 30, 2007.

(51) Int. Cl.
*H01L 21/00* (2006.01)
(52) U.S. Cl. .................. 438/95; 438/102; 438/693; 257/42; 257/214
(58) Field of Classification Search .......... 438/102, 438/693; 257/42, 214, E21.23, E29.068
See application file for complete search history.

(56) References Cited

U.S. PATENT DOCUMENTS

| 5,993,686 | A | * | 11/1999 | Streinz et al. ............. 252/79.3 |
| 6,795,338 | B2 | | 9/2004 | Parkinson et al. |
| 7,531,105 | B2 | * | 5/2009 | Dysard et al. ............. 252/79.1 |
| 2007/0012906 | A1 | * | 1/2007 | Kim et al. .................. 257/3 |
| 2008/0105652 | A1 | * | 5/2008 | Brusic et al. ............... 216/89 |
| 2008/0190035 | A1 | * | 8/2008 | Lu et al. .................... 51/307 |

OTHER PUBLICATIONS

Gregory B. Shinn et al, Chemical-Mechanical Polish, Handbook of Semiconductor Mfg. Tech., Chapter 15, 2000, pp. 415-460.

* cited by examiner

*Primary Examiner*—Phuc T Dang
(74) *Attorney, Agent, or Firm*—Geoffrey L. Chase; John R. Dodd

(57) ABSTRACT

A method and associated composition for chemical mechanical planarization of a chalcogenide-containing substrate (e.g., germanium/antimony/tellurium (GST)-containing substrate) are described. The composition and method afford low defect levels as well as low dishing and local erosion levels on the chalcogenide-containing substrate during CMP processing.

18 Claims, No Drawings

METHOD FOR CHEMICAL MECHANICAL PLANARIZATION OF CHALCOGENIDE MATERIALS

CROSS REFERENCE TO RELATED APPLICATION

This patent application claims the benefit of U.S. Provisional Patent Application Ser. No. 60/968,924 filed 30 Aug. 2007.

BACKGROUND OF THE INVENTION

This invention relates generally to the chemical-mechanical planarization (CMP) of substrates containing chalcogenide materials (e.g., germanium/antimony/tellurium alloy) on semiconductor wafers and slurry compositions therefor. In particular, the present invention relates to a CMP method using an associated slurry composition that is effective for use in chalcogenide CMP and which affords low defect counts and low dishing levels on polished substrates following CMP processing. This invention is especially useful for CMP of chalcogenide alloy materials where low defect counts and dishing levels on planarized substrates is desired.

Chalcogenide materials possess the property of undergoing phase changes with different phases having different electrical properties and thereby have potential applications in new memory devices. The Germanium, Antimony, and Tellerium (GST) alloy is one of many in a family of phase change chalcogenide materials being considered for use in future advanced memory devices. If successful, these devices could replace many of the memory chips currently used today (DRAM, Flash, etc.) and become a major new market. The GST material typically is deposited onto the surface of a wafer and into various features etched into the surface of the wafer during the construction of the memory devices. The overburden of material above and between the etched features is required to be removed. The state of the art technique for removing this material overburden is chemical mechanical polishing (CMP).

Memory having access devices using phase change material such as chalcogenide is known; see, for example, U.S. Pat. No. 6,795,338. Such phase change memory devices use phase change materials, i.e., materials that may be electrically switched between a generally amorphous state and a generally crystalline state, for electronic memory applications (as is reported in this patent).

Chemical mechanical planarization (chemical mechanical polishing, CMP) for planarization of semiconductor substrates is now widely known to those skilled in the art and has been described in numerous patents and open literature publications. An introductory reference on CMP is as follows: "Chemical-Mechanical Polish" by G. B. Shinn et al., Chapter 15, pages 415-460, in Handbook of Semiconductor Manufacturing Technology, editors: Y. Nishi and R. Doering, Marcel Dekker, New York City (2000).

In a typical CMP process, a substrate (e.g., a wafer) is placed in contact with a rotating polishing pad attached to a platen. A CMP slurry, typically an abrasive and a chemically reactive mixture, is supplied to the pad during CMP processing of the substrate. During the CMP process, the pad (fixed to the platen) and substrate are rotated while a wafer carrier system or polishing head applies pressure (downward force) against the substrate. The slurry accomplishes the planarization (polishing) process by chemically and mechanically interacting with the substrate film being planarized due to the effect of the rotational movement of the pad relative to the substrate. Polishing is continued in this manner until the desired film on the substrate is removed with the usual objective being to effectively planarize the substrate. Typically CMP slurries for polishing metals, including chalcogenide alloys, contain an abrasive material, such as silica or alumina, suspended in an oxidizing, aqueous medium.

Silicon based semiconductor devices, such as integrated circuits (ICs), typically include a dielectric layer, which can be a low-k dielectric material, silicon dioxide, or other material. Multilevel circuit traces, typically formed from aluminum or an aluminum alloy or copper, are patterned onto the low-k or silicon dioxide substrate. In case of advanced memory devices as referenced supra, chalcogenide materials that are capable of undergoing phase changes may also be deposited in manufacture of these advanced semiconductor devices.

CMP processing is often employed to remove and planarize excess metal (e.g., removal of overburden chalcogenide alloys) at different stages of semiconductor manufacturing. For example, one way to fabricate a multilevel metal (e.g., copper as referenced below) interconnect or planar metal (e.g., copper) circuit traces on a silicon dioxide substrate is referred to as the damascene process. In a semiconductor manufacturing process typically used to form a multilevel copper interconnect, metallized copper lines or copper vias are formed by electrochemical metal deposition followed by copper CMP processing. In a typical process, the interlevel dielectric (ILD) surface is patterned by a conventional dry etch process to form vias and trenches for vertical and horizontal interconnects and make connection to the sublayer interconnect structures. The patterned ILD surface is coated with an adhesion-promoting layer such as titanium or tantalum and/or a diffusion barrier layer such as titanium nitride or tantalum nitride over the ILD surface and into the etched trenches and vias. The adhesion-promoting layer and/or the diffusion barrier layer is then overcoated with copper, for example, by a seed copper layer and followed by an electrochemically deposited copper layer. Electro-deposition is continued until the structures are filled with the deposited metal. Finally, CMP processing is used to remove the copper overlayer, adhesion-promoting layer, and/or diffusion barrier layer, until a planarized surface with exposed elevated portions of the dielectric (silicon dioxide and/or low-k) surface is obtained. The vias and trenches remain filled with electrically conductive copper forming the circuit interconnects.

When one-step metal CMP processing is desired, it is usually important that the removal rate of the metal and barrier layer material be significantly higher than the removal rate for dielectric material in order to avoid or minimize dishing of metal features or erosion of the dielectric. Alternatively, a multi-step metal CMP process may be employed involving the initial removal and planarization of the metal overburden, referred to as a step 1 metal CMP process, followed by a barrier layer CMP process. The barrier layer CMP process is frequently referred to as a barrier or step 2 metal CMP process. Previously, it was believed that the removal rate of the metal and the adhesion-promoting layer and/or the diffusion barrier layer must both greatly exceed the removal rate of dielectric so that polishing effectively stops when elevated portions of the dielectric are exposed. The ratio of the removal rate of a metal to the removal rate of dielectric base is called the "selectivity" for removal of the metal in relation to dielectric during CMP processing of substrates comprised of the metal and dielectric material. When CMP slurries with high selectivity for removal of a metal(s) in relation to a dielectric are used, the metal layer(s) is easily over-polished creating a depression or "dishing" effect in the metal vias and trenches. This feature distortion is unacceptable due to lithographic and other constraints in semiconductor manufacturing.

Another feature distortion that is unsuitable for semiconductor manufacturing is called "erosion." Erosion is the topography difference between a field of dielectric and a dense array of metallic vias or trenches. In CMP, the materials in the dense array maybe removed or eroded at a faster rate than the surrounding field of dielectric. This causes a topography difference between the field of dielectric and the dense metal array.

A typically used CMP slurry has two actions, a chemical component and a mechanical component. An important consideration in slurry selection for metal CMP (e.g., chalcogenide alloy CMP) is "passive etch rate." The passive etch rate is the rate at which metal is dissolved by the chemical component alone and should be significantly lower than the removal rate when both the chemical component and the mechanical component are involved. A large passive etch rate leads to dishing of the metal trenches and vias, and thus, preferably, the passive etch rate is less than 10 nanometers per minute.

These are two general types of layers that can be polished. The first layer is interlayer dielectrics (ILD), such as silicon oxide and silicon nitride. The second layer is metal layers such as tungsten, copper, aluminum, etc., which are used to connect the active devices or chalcogenide alloys, which are used within the active devices.

In the case of CMP of metals (e.g., chalcogenide alloys), the chemical action is generally considered to take one of two forms. In the first mechanism, the chemicals in the solution react with the metal layer to continuously form an oxide layer on the surface of the metal. This generally requires the addition of an oxidizer to the solution such as hydrogen peroxide, ferric nitrate, periodic acid, etc. Then the mechanical abrasive action of the particles continuously and simultaneously removes this oxide layer. A judicious balance of these two processes obtains optimum results in terms of removal rate and polished surface quality.

In the second mechanism, no protective oxide layer is formed. Instead, the constituents in the solution chemically attack and dissolve the metal, while the mechanical action is largely one of mechanically enhancing the dissolution rate by such processes as continuously exposing more surface area to chemical attack, raising the local temperature (which increases the dissolution rate) by the friction between the particles and the metal and enhancing the diffusion of reactants and products to and away from the surface by mixing and by reducing the thickness of the boundary layer.

While prior art CMP systems are capable of removing a metal overlayer(s) from a silicon dioxide substrate, the systems do not satisfy the rigorous demands of the semiconductor industry. These requirements can be summarized as follows. First, there is a need for high removal rates of metal(s) to satisfy throughput demands. Secondly, there must be excellent topography uniformity across the substrate. Finally, the CMP method must minimize dishing and local erosion effects on polished substrates as well as minimizing defectivity levels to satisfy ever increasing lithographic demands.

There is a significant need for metal CMP process(es) and slurry(s) that are applicable to efficient CMP processing of substrates containing chalcogenide alloys and that afford low dishing and local erosion effects as well as low defectivity levels. These requirements are especially important in view of the fact that the semiconductor industry continues to move towards smaller and smaller feature sizes. The present invention provides a solution to this significant need.

BRIEF SUMMARY OF THE INVENTION

In an embodiment, the invention is a method for for chemical mechanical planarization of a surface having at least one feature thereon comprising a chalcogenide material, said method comprising the steps of:
  A) placing a substrate having the surface having the at least one feature thereon comprising a chalcogenide material in contact with a polishing pad;
  B) delivering a polishing composition comprising:
    a) an abrasive; and
    b) an oxidizing agent; and
  C) polishing the substrate with the polishing composition.

In another embodiment, the invention is a substrate having a surface, the surface having at least one feature thereon comprising a chalcogenide material, wherein the substrate is made by the method as listed above. In an embodiment, the substrate is made using the method as shown above wherein the oxidizing agent is selected from the group consisting of periodic acid, hydrogen peroxide, urea hydrogen peroxide, benzoyl peroxide, 2-butanone peroxide, tert-butyl hydroperoxide, cumeme hydroperoxide, di-tert-amyl peroxide, dicumyl peroxide, lauroyl peroxide, and 2,4-pentanedione peroxide. In another embodiment, the substrate is made using the method as shown above wherein the oxidizing agent is periodic acid.

DETAILED DESCRIPTION OF THE INVENTION

This invention involves a method using associated polishing compositions (slurries) for polishing of chalcogenide materials and, in particular, for chemical mechanical planarization of chalcogenide materials. The associated polishing compositions comprise an abrasive and an oxidizing agent. Such compositions have been surprisingly and unexpectedly found to afford relatively high removal rates of chalcogenide materials (e.g., GST alloy) while simultaneously affording low defectivity levels. In certain embodiments, the associated polishing composition further comprises a selected corrosion inhibitor; use of this type of slurry in chalcogenide CMP further affords relatively low levels of dishing during the course of chalcogenide CMP (e.g., GST alloy CMP) relative to comparable compositions without the selected corrosion inhibitor. The prevention of dishing/erosion of features on semiconductor substrates during CMP processing is becoming increasingly more important as the semiconductor industry trends to smaller and smaller feature sizes in the manufacture of integrated circuits.

For CMP processing of certain chalcogenide substrates in some embodiments according to the invention, the oxidizing agent can be any one or more of a wide range of oxidizing agents. In these embodiments, suitable oxidizing agents include, for example, one or more per-compounds, which comprise at least one peroxy group (—O—O—). Suitable per-compounds include, for example, peroxides, persulfates (e.g., monopersulfates and dipersulfates), percarbonates, and acids thereof, and salts thereof, and mixtures thereof. Other suitable oxidizing agents include, for example, oxidized halides (e.g., chlorates, bromates, iodates, perchlorates, perbromates, periodates, and acids thereof, and mixtures thereof, and the like), perboric acid, perborates, percarbonates, peroxyacids (e.g., peracetic acid, perbenzoic acid, m-chloroperbenzoic acid, salts thereof, mixtures thereof, and the like), permanganates, chromates, cerium compounds, ferricyanides (e.g., potassium ferricyanide), mixtures thereof, and the like. Some specific oxidizers that are useful in this invention include, but are not limited to, hydrogen peroxide, urea hydrogen peroxide, periodic acid, benzoyl peroxide, 2-butanone peroxide, tert-butyl hydroperoxide, cumeme hydroperoxide, di-tert-amyl peroxide, dicumyl peroxide, lauroyl peroxide, 2,4-pentanedione peroxide, potassium iodate, potassium permanganate, ammonium persulfate, ammonium molybdate, ferric nitrate, nitric acid, potassium nitrate, ammonia, and other amine compounds, and mixtures thereof. Preferred oxidizing agents include, for example, periodic acid, hydrogen peroxide and urea-hydrogen peroxide.

For CMP processing of certain chalcogenide substrates (e.g., GST alloy) in other embodiments according to the invention, the oxidizing agent includes, but is not limited to, hydrogen peroxide, urea hydrogen peroxide, periodic acid, benzoyl peroxide, 2-butanone peroxide, tert-butyl hydroperoxide, cumeme hydroperoxide, di-tert-amyl peroxide, dicumyl peroxide, lauroyl peroxide, and 2,4-pentanedione peroxide. In an embodiment, the oxidizing agent is selected from the group consisting of hydrogen peroxide, urea hydrogen peroxide, periodic acid, benzoyl peroxide, 2-butanone peroxide, tert-butyl hydroperoxide, cumeme hydroperoxide, di-tert-amyl peroxide, dicumyl peroxide, lauroyl peroxide, and 2,4-pentanedione peroxide. In another embodiment, the oxidizing agent is selected from the group consisting of periodic acid, hydrogen peroxide, and urea hydrogen peroxide. In yet another embodiment, the oxidizing agent is periodic acid.

In the method of this invention, periodic acid is used as a preferred oxidizing agent. When used, the concentration of periodic acid is from about 0.01 weight % to about 3 weight % of the total weight of the slurry in an embodiment. In another embodiment, the concentration of periodic acid is from about 0.15 weight % to about 2 weight % of the total weight of the slurry. In another embodiment, the concentration of periodic acid is from about 0.15 weight % to about 1 weight % of the total weight of the slurry. In another embodiment, the concentration of periodic acid is from about 0.15 weight % to about 0.35 weight % of the total weight of the slurry.

In an embodiment of the invention, a suitable oxidizing agent is any one that has an oxidation potential that exceeds that of all constituents of the composition by at least 10 millivolts (mV).

Levels of oxidizing agent in a slurry can range from about 0.01 weight percent to about 5 weight percent. In an embodiment, the level of oxidizing agent is in the range of 0.5 weight percent to 3 weight percent. In another embodiment, the level of oxidizing agent is in the range of 1 weight percent to 3 weight percent. In another embodiment, the level of oxidizing agent is in the range of 0.5 weight percent to 2 weight percent. In another embodiment, the level of oxidizing agent is in the range of 0.1 weight percent to 0.5 weight percent.

In an embodiment according to the invention, the polishing composition used in the method further comprises c) at least one compound selected from the group consisting of corrosion inhibitors and surfactants. In another embodiment, the at least one compound c) is a corrosion inhibitor. In still another embodiment, the corrosion inhibitor is an N-acyl-N-hydrocarbonoxyalkyl aspartic acid compound having the formula

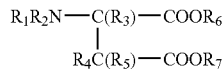

wherein $R_1$ is a hydrocarbonoxyalkyl group of from about 6 to about 30 carbon atoms, $R_2$ is a carboxyl substituted acyl group containing from about 2 to about 30 carbon atoms, or such a group at least partially neutralized with an alkali metal base, an alkaline earth metal base, an amine or a mixture of any of the foregoing, and $R_3$, $R_4$, $R_5$, $R_6$, and $R_7$ are each, independently, selected from hydrogen or a hydrocarbon group of from about 1 to about 30 carbon atoms. Examples of suitable corrosion inhibitors having the above general formula are CDX2128 (now named K-Pure CDI4303) and CDI4310, both available from King Industries (Norwalk, Conn.). Use of these corrosion inhibitors and/or surfactant additives in the polishing compositons utilized in the methods according to the invention surprisingly has been found to significantly mimimize chalcogenide (e.g., GST alloy) feature recess (dishing), while not adversely impacting chalcogenide removal rate or post polish defects.

The levels of corrosion inhibitors and/or surfactant additives used in the compositions according to the method can range from about 0.1 ppm to about 500 ppm in an embodiment and from about 0.1 ppm to about 100 ppm in another embodiment. In an embodiment, this range is about 1 ppm to about 100 ppm. In another embodiment, this range is about 10 ppm to 60 ppm. In yet another embodiment, this range is about 10 ppm to about 50 ppm. In another embodiment, this range is about 10 ppm to about 40 ppm. In yet another embodiment, this range is about 20 ppm to about 40 ppm. As an example, when a N-acyl-N-hydrocarbonoxyalkyl aspartic acid compound is used as a corrosion inhibitor according to the invention, the level of this compound can broadly range from about 10 ppm to about 500 ppm in the composition.

The slurry compositions used in the method of this invention can have pH values that range from highly acidic to highly basic and include neutral pH of 7. Acidic pH values can range from about 1 to less than 7. In an embodiment the pH ranges from about 1 to less than 5. In another embodiment, the pH ranges from about 1 to about 4; in yet another, from about 1 to about 3; and in yet another, from about 1 to about 2. Basic pH values in other embodiments can range from >7 to about 14.

Suitable abrasives for this invention include, but are not limited to, alumina, ceria, germania, silica, titania, zirconia, and mixtures thereof. In one embodiment, the abrasive is silica (colloidal silica or fumed silica). In an embodiment, the abrasive is colloidal silica. The abrasive level in the slurry can broadly range from a concentration of about 10 ppm to about 25 weight % of the total weight of the slurry. In a preferrred embodiment, the abrasive level is relatively low and ranges from about 10 ppm to about 2 weight percent. In an embodiment, the abrasive level is about 10 ppm to about 1 weight percent; in another embodiment, the abrasive level ranges from about 25 ppm to about 100 ppm.

Other chemicals that may be added to the CMP slurry composition include, for example, surfactants, pH-adjusting agents, acids, additional corrosion inhibitors, fluorine-containing compounds, chelating agents, nitrogen-containing compounds, and salts.

Suitable surfactant compounds that may be added to the slurry composition according to the method include, for example, any of the numerous nonionic, anionic, cationic or amphoteric surfactants known to those skilled in the art. The surfactant compounds may be present in the slurry composition in a concentration of about 0 weight % to about 1 weight % and, when present, are preferably present in a concentration of about 0.001 weight % to about 0.1 weight % of the total weight of the slurry.

The pH-adjusting agent is used to improve the stability of the polishing composition used in the method of the present invention, to improve the safety in handling and use, and/or to meet the requirements of various regulations. Suitable pH-adjusting agents to lower the pH of the polishing composition include, but are not limited to, hydrochloric acid, nitric acid, sulfuric acid, chloroacetic acid, tartaric acid, succinic acid, citric acid, malic acid, malonic acid, various fatty acids, various polycarboxylic acids and mixtures thereof. Suitable pH-adjusting agents to raise the pH of the polishing composition of the present invention include, but are not limited to, potassium hydroxide, sodium hydroxide, ammonia, tetramethylammonium hydroxide, ethylenediamine, piperazine, polyethyleneimine, modified polyethyleneimines, and mixtures thereof.

Suitable acid compounds that may be added to the slurry composition according to the method include, but are not limited to, formic acid, acetic acid, propanoic acid, butanoic acid, pentanoic acid, hexanoic acid, heptanoic acid, octanoic acid, nonanoic acid, lactic acid, hydrochloric acid, nitric acid, phosphoric acid, sulfuric acid, hydrofluoric acid, malic acid, tartaric acid, gluconic acid, citric acid, phthalic acid, pyrocatechoic acid, pyrogallol carboxylic acid, gallic acid, tannic acid, and mixtures thereof. These acid compounds may be present in the slurry composition in a concentration of about 0 weight % to about 1 weight % of the total weight of the slurry.

To increase the removal rates of the slurry for various metals (e.g., GST alloy) relative to silicon dioxide, fluorine-containing compounds may be added to the slurry composition according to the method. Suitable fluorine-containing compounds include, but are not limited to, hydrogen fluoride, perfluoric acid, alkali metal fluoride salt, alkaline earth metal fluoride salt, ammonium fluoride, tetramethylammonium fluoride, ammonium bifluoride, ethylenediammonium difluoride, diethylenetriammonium trifluoride, and mixtures thereof. The fluorine-containing compounds may be present in the slurry composition in a concentration of about 0 weight % to about 5 weight % in an 15 embodiment, and can be present in a concentration of about 0.10 weight % to about 2 weight % of the total weight of the slurry in another embodiment. A preferred fluorine-containing compound is ammonium fluoride, most preferably present in a concentration of about 0 weight % to about 1 weight % of the total weight of the slurry.

Suitable chelating agents that may be added to the slurry composition according to the method include, but are not limited to, ethylenediaminetetracetic acid (EDTA), N-hydroxyethylethylenediaminetriacetic acid (NHEDTA), nitrilotriacetic acid (NTA), diethylenetriaminepentacetic acid (DPTA), ethanoldiglycinate, tricine, 2,2'-bipyridyl, tartaric acid, glutamic acid, aspartic acid, glutamine, L-aspartic acid, L-tryptophan, L-asparagine, L-arginine and mixtures thereof. The chelating agents may be present in the slurry composition in a concentration of about 0 weight % to about 3 weight % in an embodiment, and are present in a concentration of about 0.05 weight % to about 0.20 weight % of the total weight of the slurry in another embodiment. Preferred chelating agents are tricine and EDTA and, if present, are most preferably present in a concentration of about 0.05 weight % to about 0.20 weight % of the total weight of the slurry.

Suitable nitrogen-containing compounds that may be added to the slurry composition according to the method include, but are not limited to, ammonium hydroxide, hydroxylamine, monoethanolamine, diethanolamine, triethanolamine, diethyleneglycolamine, N-hydroxylethylpiperazine, polyethyleneimine, modified polyethyleneimines, and mixtures thereof. Suitable nitrogen-containing compounds also include various amino acids. Suitable amino acids include, but are not limited to, alanine, arginine, asparagine, aspartic acid, cysteine, glutamic acid, glutamine, glycine, histidine, isoleucine, leucine, lysine, methionine, phenylalanine, proline, serine, threonine, tryptophan, tyrosine, and valine. In an embodiment, the amino acid is glycine. The nitrogen-containing compounds may be present in the slurry composition in a concentration of about 0 weight % to about 1 weight % in an embodiment, and are present in a concentration of about 0.01 weight % to about 0.20 weight % of the total weight of the slurry in another embodiment.

Suitable additional corrosion inhibitors for use in the slurry compositions according to the method of this invention are optional and include benzotriazole, 6-tolyltriazole, 1,2,3-triazole, 1,2,4-triazole, 1-dodecanethiol, 3-amino-triazole, 3-amino-1,2,3-triazole-5-thiol, 1-phenyl-1H-tetrazole-5-thiol, 2-mercaptobenzothiazole, hexanethiol, 5-methyl-1H-benzotriazole, 2-amino-4-thiazole-acetic acid, dodecanethiol and combinations thereof. If present, these additional corrosion inhibitors are at levels in the range from about 0.01 weight % to about 1 weight %.

Suitable salts that may be added to the slurry composition include, but are not limited to, ammonium persulfate, potassium persulfate, potassium sulfite, potassium carbonate, ammonium nitrate, potassium hydrogen phthalate, hydroxylamine sulfate, and mixtures thereof. The salts may be present in the slurry composition in a concentration of about 0 weight % to about 10 weight % in an embodiment, and are preferably present in a concentration of about 0 weight % to about 5 weight % of the total weight of the slurry in another embodiment.

Still other chemicals that can be added to the slurry compositions are biological agents such as bactericides, biocides and fungicides especially if the pH is around about 6 to 9. Suitable biocides, include, but are not limited to, 1,2-benzisothiazolin-3-one; 2(hydroxymethyl)amino ethanol; 1,3-dihydroxymethyl-5,5dimethylhydantoin; 1-hydroxymethyl-5,5-dimethylhydantion; 3-iodo-2-propynyl butylcarbamate; glutaraldehyde; 1,2-dibromo-2,4-dicyanobutane; 5-chloro-2-methyl-4-isothiazoline-3-one; 2-methyl-4-isothiazolin-3-one; and mixtures thereof.

Method of Invention

The method of this invention entails use of the aforementioned composition (as disclosed supra) for chemical mechanical planarization of substrates comprised of chalcogenide materials (e.g., GST alloy) and dielectric materials. In the method, a substrate (e.g., a wafer) is placed face-down on a polishing pad which is fixedly attached to a rotatable platen of a CMP polisher. In this manner, the substrate to be polished and planarized is placed in direct contact with the polishing pad. A wafer carrier system or polishing head is used to hold the substrate in place and to apply a downward pressure against the backside of the substrate during CMP processing while the platen and the substrate are rotated. The polishing composition (slurry) is applied (usually continuously) on the pad during CMP processing to effect the removal of material to planarize the substrate.

In an embodiment, the invention is a method for chemical mechanical planarization of a surface having at least one feature thereon comprising a chalcogenide material, such as germanium/antimony/tin alloy (GST). The chalcogenide material can include, but is not limited to, an alloy comprising at least one element selected from the group consisting of germanium, antimony, tellurium, silicon, arsenic, phosphorous, indium, scandium, yttrium, lanthanum, boron, aluminum, gallium, thallium, nitrogen, bismuth, vanadium, tantalum, and niobium. In one embodiment, the chalcogenide material is an alloy of germanium, antimony, and tellurium. In another embodiment, the chalcogenide material is an alloy of indium, antimony, and tellurium.

In an embodiment, the CMP method and associated composition according to the invention facilitates removal of chalcogenide material from the surface of the substrate with a removal rate at 1.5 psi down force of at least 1000 angstroms/minute and with a post polish SP1defect count (>0.3 μm) of less than 100 and a GST feature recess of <150 angstroms.

The method and the associated slurry of this invention are effective for CMP of a wide variety of substrates, including substrates having dielectric portions that comprise materials having dielectric constants less than 3.3 (low-k materials). Suitable low-k films in substrates include, but are not limited to, organic polymers, carbon-doped oxides, fluorinated silicon glass (FSG), inorganic porous oxide-like materials, and hybrid organic-inorganic materials. Representative low-k materials and deposition methods for these materials are summarized below.

| Vendor | Trade Name | Deposition Method | Material |
|---|---|---|---|
| Air Products and Chemicals | MesoElk ® | Spin-on | Hybrid organic-inorganic |
| Applied Materials | Black Diamond | CVD | Carbon-doped oxide |
| Dow Chemical | SiLK ™, Porous SiLK ™ | Spin-on | Organic polymer |
| Honeywell Electronic Materials | NANOGLASS ® E | Spin-on | Inorganic oxide-like |
| Novellus Systems | CORAL ® | PECVD | Carbon-doped oxide |

PECVD = Plasma enhanced chemical vapor deposition
CVD = chemical vapor deposition

GLOSSARY

| COMPONENTS | |
|---|---|
| Colloidal silica | Nyacol 50zk-DI (Nyacol Nano Technologies, Inc., Ashland, MA) potassium stabilized colloidal silica. |
| Colloidal silica | Microplanar 3850 (Precision Colloids, LLC, Cartersville, GA) colloidal silica. |
| Colloidal silica | PL-3 Ultra pure (Fuso Chemical Co., Ltd, Osaka, Japan) |
| CDX-2128/CDI4303 | Amino Acid Derivative Corrosion Inhibitor (King Industries, Norwalk, CT) |
| CDI4310 | Amino Acid Derivative Corrosion Inhibitor (King Industries, Norwalk, CT) |
| GST | Germanium Antimony Tellurium |
| PIA | Periodic Acid |
| Polishing Pad | Polishing pad, IC1000 and Politex ®, were used during CMP, supplied by Rohm and Haas, Inc., Phoenix, AZ. |

PARAMETERS

General

| | |
|---|---|
| Å: | angstrom(s) - a unit of length |
| CMP: | chemical mechanical planarization = chemical mechanical polishing |
| CS: | carrier speed |
| DF: | Down force: pressure applied during CMP, units psi |
| EPD: | Endpoint Detection |
| min: | minute(s) |
| sec.: | second(s) |
| ml: | milliliter(s) |
| mV: | millivolt(s) |
| psi: | pounds per square inch |
| PS: | platen rotational speed of polishing tool, in rpm (revolution(s) per minute) |
| SF: | slurry flow, ml/min |
| Wgt: | Weight percent |

Removal Rates and Selectivities

| | |
|---|---|
| GST RR @ 1.5 psi | Measured GST removal rate at 1.5 psi downforce of the CMP tool |
| Ti RR @ 1.5 psi | Measured titanium removal rate at 1.5 psi downforce of the CMP tool |
| HDP RR @ 1.5 psi | Measured High Density Plasma oxide removal rate at 1.5 psi downforce of the CMP tool |
| Si3N4 RR @ 1.5 psi | Measured Silicon Nitride removal rate at 1.5 psi downforce of the CMP tool |

The present invention is further demonstrated by the examples below.

EXAMPLES

General

All percentages are weight percentages unless otherwise indicated.

CMP Methodology

In the examples presented below, CMP experiments were run using the procedures and experimental conditions given below.

Metrology

GST thickness was not measured prior to polishing. GST removal rate was calculated by using the initial film thickness divided by the EPD clear time. HDP oxide and S3N4 film and were measured pre and post polish with a thin film thickness measuring instrument, Nanometrics, model, #9200, manufactured by Nanometrics Inc, 1550 Buckeye, Milpitas, Calif. 95035-7418. Titanium films were measured pre and post polish with a metal thickness measuring instrument, ResMap CDE, model 178, manufactured by Creative Design Engineering, Inc, 20565 Alves Dr, Cupertino, Calif., 95014. The ResMap tool is a four-point probe sheet resistance tool. Forty nine-point diameter scans were taken with the respective tools at 3-mm edge exclusion.

CMP Tool

The CMP tool that was used is a Mirra®, manufactured by Applied Materials, 3050 Bowers Avenue, Santa Clara, Calif., 95054. A Rohm and Haas IC1000 polyurethane stacked pad was used to remove the GST film and a Politex® embossed pad was used for a dionized wafer buff step. Both pads were supplied by Rohm and Haas, Inc, 3804 East Watkins Street, Phoenix, Ariz., 85034. The IC1000 pad was broken-in with 18 minutes of pad conditioning using a diamond conditioning disc from Saesol, Inc. at 7 lbs downforce. In order to qualify the tool settings and the pad break-in, two silicon dioxide fillers plus 2 GST monitors were polished with a version of the GST slurry deemed a "control".

In blanket wafers studies, one process recipe was used to determine GST removal rate and post polish defects on the remaining silicon dioxide surface, and titanium, HDP oxide, and Si3N4 removal rates. The polish tool conditions were: platen speed, 31 rpm; carrier speed, 30 rpm; membrane pressure, 1.5 psi; inter-tube pressure, 2.1 psi; retaining ring pressure, 2.1 psi; slurry flow, 200 ml/min.

Defect counts were measured using an SP1 instrument manufactured by KLA-Tencor, located at 1-Technology Drive, Milpitas, Calif., 95035. This instrument is a laser-based wafer surface inspection system. Using this instrument, particles and surface defects on unpatterned substrates were obtained. The particle count was recorded as number of defects, location of defects, and the size of defects. Experiments were done by loading the wafers with a vacuum wand into a cassette, followed by placing the cassette on the SP1 instrument and measured using a recipe which measures only defects that are greater than 0.3 micron (pm). The sum of all defect values was recorded as post CMP defects as reported in Tables 1, 2 and 3.

Wafers

Polishing experiments were conducted using physical vapor deposition (PVD) deposited GST films on silicon wafers. The film thickness specifications of these blanket wafers are summarized below:

GST: 2,000 Å on silicon dioxide on silicon
Titanium: 3,000 Å on silicon dioxide on silicon
HDP Oxide: 10,000 Å on silicon
Si3N4: 2,000 Å on silicon

Example 1

Components of mixture for preparing 4 kg of formulated slurry
1) Deionized Water=2216 grams
2) Colloidal silica (30% solids)=1 wgt % (total solids)=134 grams
3) Potassium Nitrate (10% solution)=3 wgt %=1200 grams
4) Hydrogen peroxide (30% solution)=3 wgt %=400 grams Procedure for Mixing the Slurry, 4 kg Batch Size In a 5-liter beaker, 134 grams of colloidal silica were added to 2216 grams of deionized water and allowed to stir using a magnetic stirrer for 2 minutes. Under agitation, 1200 grams of potassium nitrate stabilized were added slowly during a period of 2 minutes. 400 grams of hydrogen peroxide were added directly to the final solution before polishing.

Example 2 (Inventive)

This example is with Periodic Acid oxidizer in place of potassium nitrate and hydrogen peroxide oxidizers for comparison with Example 1. The colloidal silica is the same as described in Example 1. The components are summarized below:

Components of Mixture for Preparing 2.5 kg of Formulated Slurry
1) Deionized Water=2291 grams
2) Colloidal silica (30% solids)=1 wgt % (total solids)=84 grams
3) Periodic Acid (10% solution)=0.5 wgt %=125 grams Procedure for Mixing the Slurry, 2.5 kg Batch Size In a 5-liter beaker, 84 grams of colloidal silica were added to 2291 grams of deionized water and allowed to stir using a magnetic stirrer for 2 minutes. Under agitation, 125 grams of periodic acid were added slowly during a period of 10 minutes to the final solution before polishing.

Example 3

This example is with alumina coated colloidal silica, potassium nitrate, and hydrogen peroxide. The formulation is the same as described in Example 1, except that alumina coated colloidal silica is used in place of colloidal silica. The components are summarized below:

Components of Mixture for Preparing 2 kg of Formulated Slurry
1) Deionized Water=1152 grams
2) Alumina coated colloidal silica (42% solids)=1 wgt % (total solids)=48 grams 3) Potassium Nitrate (10% solution)=3 wgt %=600 grams
4) Hydrogen peroxide (30% solution)=3 wgt %=200 grams Procedure for Mixing the Slurry, 2 kg Batch Size In a 5-liter beaker, 48 grams of alumina coated colloidal silica were added to 1152 grams of deionized water and allowed to stir using a magnetic stirrer for 2 minutes. Under agitation, 600 grams of potassium nitrate silica were added slowly during a period of 2 minutes. 400 grams of hydrogen peroxide were added directly to the final solution before polishing.

Example 4 (Inventive)

This example is with periodic acid oxidizer in place of potassium nitrate and hydrogen peroxide oxidizers for comparison with Example 3. The alumina coated colloidal silica is the same as described in Example 3. The components are summarized below:

Components of Mixture for Preparing 2.5 kg of Formulated Slurry
1) Deionized Water=2315 grams
2) Alumina coated colloidal silica (42% solids)=1 wgt % (total solids)=60 grams
3) Periodic Acid (10% solution)=0.5 wgt %=125 grams Procedure for Mixing the Slurry, 2.5 kg Batch Size In a 5-liter beaker, 60 grams of alumina coated colloidal silica were added to 2315 grams of deionized water and allowed to stir using a magnetic stirrer for 2 minutes. Under agitation, 125 grams of periodic acid were added slowly during a period of 10 minutes to the final solution before polishing.

The results obtained for Examples 1-4 are summarized in Table 1. As shown in this table, use of a CMP slurry containing PIA oxidizer instead of other oxidizers, such as KNO3 and H2O2, show a dramatic impact on removing post polish micro residues and achieving orders of magnitude lower defects. This was independent of use of colloidal silica or alumina coated colloidal silica as abrasive. In addition GST removal rate was not significantly negatively impacted compared to other types of oxidizers. The other films polished are of lesser importance, but no negative aspects from using PIA on these were found.

TABLE 1

Effect of Replacing Typical Oxidizers with Periodic Acid Oxidizer on GST Removal Rates, Post Polish GST Residues and Defect Counts, Titanium, HDP Oxide, and Silicon Nitride Removal Rates

| Sample | Example 1: Colloidal Silica with KNO3 and H2O2 oxidizers | Example 2: Inventive, Colloidal Silica with PIA oxidizer | Example 3: Alumina Coated Colloidal Silica with KNO3 and H2O2 oxidizers | Example 4: Inventive, Alumina Coated Colloidal Silica with PIA oxidizer |
|---|---|---|---|---|
| Colloidal Silica, wt. % | 1 | 1 | 0 | 0 |
| Alumina coated Colloidal Silica wt. % | 0 | 0 | 1 | 1 |
| Potassium Nitrate, wt. % | 3 | 0 | 3 | 0 |
| Deionized water | Balance | Balance | Balance | Balance |
| Hydrogen peroxide ($H_2O_2$), wt. % | 3 | 0 | 3 | 0 |
| Periodic acid, wt. % | 0 | 0.5 | 0 | 0.5 |
| pH before adding $H_2O_2$ | 4.0 | N/A | 4.3 | N/A |
| pH before adding PIA | N/A | 4.1 | N/A | 4.1 |
| pH after adding PIA | N/A | 1.95 | N/A | 2.06 |
| GST removal rate[b] at 1.5 psi | 1071 | 1213 | 1450 | 1247 |
| GST micro residues | Yes | No | Yes | No |
| Defect Counts[c] (>0.3 um) | Saturated - >10,000 | <100 | Saturated - >10,000 | <100 |
| Titanium removal rate[b] at 1.5 psi | 340 | 0 | 40 | 96 |
| HDP oxide removal rate[b] at 1.5 psi | 49 | 44 | NA | 9 |
| Si3N4 removal rate[b] at 1.5 psi | 72 | 59 | NA | 7 |

[b]All removal rates are in units of angstroms/minute (Å/min).
[c]This row lists the number of defects of size greater than or equal to 0.3 micron measured on an oxide surface following CMP processing using the CMP slurry as listed above using a KLA SP1.

Table 2 expands on Table 1 above to focus attention on the effect of different concentrations of the periodic acid oxidizer on GST removal rate and post polish defects. If the PIA concentration goes below 0.15 wgt %, the removal rate begins to drop significantly and defects begin to rise. No visual evidence of micro residues was observed at 0.05% PIA concentration, but these residues may still be too few in number or too small to notice. The GST removal rate begins to fall at PIA concentrations above 0.35 wgt % and bottoms out at around 1 wgt % concentration, however, post polish defects and micro residues remain good. Although ORP remains elevated at all concentrations tested, it begins to noticeably decrease at concentrations less than 0.25 wgt %. pH appears to correlate directly with PIA concentration.

Table 3 expands the results from blanket wafers onto patterned GST wafers adding the key metric of GST feature recess. While the abrasive and the PIA oxidizer combination give good GST removal rate and post polish defect results on patterned wafers, the post polish recess of the GST in the device features is too high. Adding the corrosion inhibitor CDX 2128 in low concentrations to the formulation dramatically reduced the recess. Additional CMP process parameter changes, such as polish downforce and/or platen speed appear to further lower the recess results.

TABLE 2

Comparison of Periodic Acid Concentrations for PH, Oxidation Reduction Potential (ORP), GST Removal Rate, Post Polish Micro-residue, and Post Polish Defect Counts - Slurry Components Same as Described in Table 1

| Abrasive | Other Additive | Oxidizer | PH | ORP (mV) | GST Removal Rate (Å/min.) | Micro Residue | Defect Counts (2 wfrs) |
|---|---|---|---|---|---|---|---|
| 1 wgt % Colloidal Silica | None | 0.05 wgt % PIA | 2.7 | 1110 | 706 | No | 462, 436 |
| 1 wgt % Colloidal Silica | None | 0.15 wgt % PIA | 2.25 | 1186 | 1200 | No | 32, 31 |
| 1 wgt % Colloidal Silica | None | 0.25 wgt % PIA | 2.05 | 1240 | 1277 | No | 35, 16 |
| 1 wgt % Colloidal Silica | None | 0.35 wgt % PIA | 1.9 | 1242 | 1558 | No | 80, 105 |
| 1 wgt % Colloidal Silica | None | 0.5 wgt % PIA | 1.8 | 1268 | 1395 | No | 100 |
| 1 wgt % Colloidal Silica | None | 1 wgt % PIA | 1.6 | 1280 | 550 | No | 43, 12 |
| 1 wgt % Colloidal Silica | None | 1.5 wgt % PIA | NA | NA | 609 | No | 23, 10 |
| 1 wgt % Colloidal Silica | None | 2 wgt % PIA | 1.4 | 1306 | 710 | No | 33, 9 |

TABLE 3

Comparison of Periodic Acid Based Slurry Formulations for GST Feature Recess (dishing) GST Removal Rate, and Post Polish

| Abrasive | Additive Type | Additive Concentration | Oxidizer Type/ Concentration | CMP Process Type | GST Feature Recess | SP1 Defect Counts (>0.3 um) | Removal Rate (A/min.) |
|---|---|---|---|---|---|---|---|
| 1 wgt % Colloidal Silica | None | N/A | PIA - 0.25 wgt % | 1 | 700-1000 Å | 7, 8 | 1379 |
| 1 wgt % Colloidal Silica | None | N/A | PIA - 2.0 wgt % | 1 | 930-1000 Å | 15, 13 | 895 |
| 1 wgt % Colloidal Silica | CDX2128 | 20 ppm | PIA - 0.2 wgt % | 1 | 160-190 Å | 40, 0 | 1304 |

TABLE 3-continued

Comparison of Periodic Acid Based Slurry Formulations for GST Feature Recess (dishing) GST Removal Rate, and Post Polish

| Abrasive | Additive Type | Additive Concentration | Oxidizer Type/ Concentration | CMP Process Type | GST Feature Recess | SP1 Defect Counts (>0.3 um) | Removal Rate (Å/min.) |
|---|---|---|---|---|---|---|---|
| 1 wgt % Colloidal Silica | CDX2128 | 40 ppm | PIA - 0.2 wgt % | 1 | 215-250 Å | 51, 75 | 1363 |

Example 5

In this example, the following composition was prepared and tested in a similar manner as described for Examples 1-4:

Example 5 Composition

| Component | Amount |
|---|---|
| Colloidal silica (ultra pure) | 0.5 wt. % |
| CDI4303 (Corrosion inhibitor) | 40 ppm |
| Periodic acid | 0.2 wt. % |
| Deionized water | Balance |
| pH before adding PIA | 8.0 |
| pH after adding PIA | 2.2 |

CMP studies as described for the earlier examples using this composition afforded the following results:

| | |
|---|---|
| GST removal rate (Å/min) | 1053 |
| Defect counts (>0.3 microns) | <50 |
| TEOS removal rate (Å/min) | <50 |
| $Si_3N_4$ removal rate (Å/min) | <50 |

Example 6

In this example, the following composition was prepared and tested in a similar manner as described for Examples 1-4:

Example 6 Composition

| Component | Amount |
|---|---|
| Colloidal silica | 1.0 wt. % |
| CDI4310 (Corrosion inhibitor) | 40 ppm |
| Periodic acid | 0.2 wt. % |
| Deionized water | Balance |
| pH before adding PIA | 4.5 |
| pH after adding PIA | 2.2 |

CMP studies as described for the earlier examples using this composition afforded the following results:

| | |
|---|---|
| GST removal rate (Å/min) | 1200 |
| Defect counts (>0.3 microns) | <50 |
| TEOS removal rate (Å/min) | <50 |
| $Si_3N_4$ removal rate (Å/min) | <50 |

CMP Process Type 1 Conditions:
Membrane down force=1.5 psi
Inner tube and retaining ring downforce=2.1 psi
Platen rotational speed=31 rpm
Carrier speed=30 rpm
Slurry flow=200 ml/min
Endpoint detection=Optical, Active While the invention has been described in combination with embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

The invention claimed is:

1. A method for chemical mechanical planarization of a surface having at least one feature thereon comprising a chalcogenide material, said method comprising the steps of:
   A) placing a substrate having the surface having the at least one feature thereon comprising a chalcogenide material in contact with a polishing pad;
   B) delivering a polishing composition comprising:
      a) an abrasive; and
      b) an oxidizing agent;
   and
   C) polishing the substrate with the polishing composition; wherein the oxidizing agent has an oxidation potential that exceeds the oxidation potential of each of the constituents in the chalcogenide material by at least 10 millivolts.

2. The method of claim 1 wherein the chalcogenide material is an alloy comprising at least one element selected from the group consisting of germanium, antimony, tellurium, silicon, arsenic, phosphorous, indium, scandium, yttrium, lanthanum, boron, aluminum, gallium, thallium, nitrogen, bismuth, vanadium, tantalum, and niobium.

3. The method of claim 1 wherein the chalcogenide material is an alloy of germanium, antimony, and tellurium.

4. The method of claim 1 wherein the chalcogenide material is an alloy of indium, antimony, and tellurium.

5. The method of claim 1 wherein the abrasive is selected from the group consisting of a silica, an alumina, and an alumina-coated silica, a ceria, a titania, and combinations thereof.

6. The method of claim 1 wherein the oxidizing agent is selected from the group consisting of periodic acid, hydrogen peroxide, urea hydrogen peroxide, benzoyl peroxide, 2-butanone peroxide, tert-butyl hydroperoxide, cumeme hydroperoxide, di-tert-amyl peroxide, dicumyl peroxide, lauroyl peroxide, and 2,4-pentanedione peroxide.

7. The method of claim 6 wherein the oxidizing agent is periodic acid and is present in the composition at a level ranging from about 0.01 weight percent to about 3 weight percent.

8. The method of claim 1 wherein the composition has a pH that is acidic and is less than or equal to 7.

9. The method of claim 1 wherein the polishing composition further comprises c) at least one compound selected from the group consisting of a corrosion inhibitor and a surfactant.

10. The method of claim 9 wherein the c) at least one compound is a corrosion inhibitor wherein the corrosion inhibitor is an N-acyl-N-hydrocarbonoxyalkyl aspartic acid compound having the formula

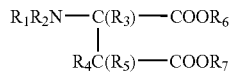

wherein $R_1$ is a hydrocarbonoxyalkyl group of from about 6 to about 30 carbon atoms, $R_2$ is a carboxyl substituted acyl group containing from about 2 to about 30 carbon atoms, or such a group at least partially neutralized with an alkali metal base, an alkaline earth metal base, an amine or a mixture of any of the foregoing, and $R_3$, $R_4$, $R_5$, $R_6$, and $R_7$ are each, independently, selected from hydrogen or a hydrocarbon group of from about 1 to about 30 carbon atoms.

11. The method of claim 9 wherein the corrosion inhibitor or the surfactant is present in the composition at a level ranging from about 1 ppm to about 100 ppm.

12. The method of claim 11 wherein the corrosion inhibitor is present in the composition at a level ranging from about 10 ppm to about 60 ppm.

13. The method of claim 1 wherein the composition facilitates removal of chalcogenide material from the surface of the substrate with a removal rate at 1.5 psi down force of at least 1000 angstroms/minute and with a post polish SP1 defect count (>0.3 μm) of less than 100 and a GST feature recess of <150 angstroms.

14. The method of claim 1 wherein the polishing composition further comprises c) a biocide.

15. The method of claim 10 wherein N-acyl-N-hydrocarbonoxyalkyl aspartic acid compound is present in the composition in a range from about 10 ppm to about 500 ppm.

16. A substrate having a surface, the surface having at least one feature thereon comprising a chalcogenide material, wherein the substrate is made by the method of claim 1.

17. A substrate having a surface, the surface having at least one feature thereon comprising a chalcogenide material, wherein the substrate is made by the method of claim 6.

18. A substrate having a surface, the surface having at least one feature thereon comprising a chalcogenide material, wherein the substrate is made by the method of claim 7.

* * * * *